United States Patent
Hirai et al.

(10) Patent No.: US 10,843,820 B2
(45) Date of Patent: Nov. 24, 2020

(54) HOLDING FIXTURE

(71) Applicant: MITSUBISHI HEAVY INDUSTRIES, LTD., Tokyo (JP)

(72) Inventors: Makoto Hirai, Tokyo (JP); Hiroki Azuma, Tokyo (JP); Takuya Goto, Tokyo (JP); Sachio Takeyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 185 days.

(21) Appl. No.: 16/070,434

(22) PCT Filed: Nov. 17, 2016

(86) PCT No.: PCT/JP2016/084131
§ 371 (c)(1),
(2) Date: Jul. 16, 2018

(87) PCT Pub. No.: WO2017/134902
PCT Pub. Date: Aug. 10, 2017

(65) Prior Publication Data
US 2019/0023417 A1    Jan. 24, 2019

(30) Foreign Application Priority Data

Feb. 2, 2016 (JP) ................................. 2016-018427

(51) Int. Cl.
*B64F 5/10* (2017.01)
*B64C 1/12* (2006.01)
(Continued)

(52) U.S. Cl.
CPC ............... *B64F 5/10* (2017.01); *B21J 15/142* (2013.01); *B23Q 3/065* (2013.01); *B64C 1/12* (2013.01)

(58) Field of Classification Search
CPC .......... B23Q 2240/00; B23Q 2240/005; B23Q 2240/002; B23Q 2240/007; B23Q 3/02;
(Continued)

(56) References Cited

U.S. PATENT DOCUMENTS 4,676,422 A     6/1987 Gidlund et al.
4,691,905 A *  9/1987 Tamura ................ B23K 37/047
                                                    269/266

(Continued)

FOREIGN PATENT DOCUMENTS

CN     103600249 A    2/2014
CN     104400086 A    3/2015
(Continued)

OTHER PUBLICATIONS

PCT/ISA/210, "International Search Report for International Application No. PCT/JP2016/084131," dated Feb. 7, 2017.
(Continued)

*Primary Examiner* — Tyrone V Hall, Jr.
(74) *Attorney, Agent, or Firm* — Manabu Kanesaka; Benjamin Hauptman; Kenneth Berner

(57) ABSTRACT

An object is to simplify a structure of a holding fixture which holds the shape of an aircraft panel, and to hold the aircraft panel in an appropriate shape. A holding fixture includes: a plurality of gripping units configured to grip edge portions on two opposite sides of a fuselage panel including a skin; and a support body configured to integrally support the plurality of gripping units, the support body being provided corresponding to the fuselage panel to be gripped by the plurality of gripping units, wherein the plurality of gripping units hold the fuselage panel such that the gripping units grip the edge portions of the fuselage panel, and the fuselage panel has a curved shape in cross section taken in a direction perpendicular to a one axis direction, and the holding fixture (Continued)

US 10,843,820 B2

Page 2 is configured to be conveyable in a state of holding the fuselage panel.

10 Claims, 10 Drawing Sheets

(51) Int. Cl.
 B21J 15/14 (2006.01)
 B23Q 3/06 (2006.01)
(58) Field of Classification Search
 CPC .......... B23Q 3/06; B23Q 3/062; B23Q 3/065; B23Q 3/18; B23Q 3/082; B23Q 7/00; B23Q 7/001; B23Q 7/03; B23Q 7/04; B23Q 7/042; B23Q 7/046; B23Q 7/048; B23Q 7/05; B25B 5/003; B25B 5/006; B64F 5/10; B64F 5/40; B64F 5/50; B64F 5/60
 See application file for complete search history.

(56) References Cited

U.S. PATENT DOCUMENTS

| | | | | |
|---|---|---|---|---|
| 4,995,146 A * | 2/1991 | Woods | ................ | B25B 5/003 269/45 |
| 5,033,178 A * | 7/1991 | Woods | ................ | B25B 11/00 29/243.57 |
| 5,350,162 A * | 9/1994 | Cushing | ............... | B21F 27/125 269/13 |
| 5,586,391 A | 12/1996 | Micale | | |
| 5,617,622 A * | 4/1997 | Anderson | .............. | B21F 27/20 29/281.3 |
| 5,664,311 A * | 9/1997 | Banks | .................. | B21J 15/022 29/33 K |
| 6,121,781 A * | 9/2000 | Martinez | ................ | B21J 15/10 324/658 |
| 6,322,063 B1 * | 11/2001 | Steinhart | ........... | B23K 37/0452 269/152 |
| 6,367,788 B1 * | 4/2002 | Babchuk | ........... | B23K 37/0443 269/45 |
| 6,598,866 B2 * | 7/2003 | Helm | .................... | B23Q 1/032 269/21 |
| 9,211,925 B2 * | 12/2015 | Jang | .................... | B62D 65/026 |
| 2002/0092149 A1 * | 7/2002 | Wolf | ........................ | B21J 15/14 29/464 |
| 2003/0034602 A1 * | 2/2003 | Kavanaugh | ............. | B25B 11/00 269/45 |
| 2003/0046801 A1 * | 3/2003 | Engstrom | ............... | B25B 5/003 29/281.4 |
| 2004/0093731 A1 * | 5/2004 | Sarh | .......................... | B21J 15/10 29/897.3 |
| 2004/0099372 A1 * | 5/2004 | Ramnauth | ................ | B23Q 7/04 156/304.1 |
| 2004/0187291 A1 * | 9/2004 | Syrek | ........................ | B23Q 3/18 29/559 |
| 2005/0242482 A1 * | 11/2005 | Nakata | .............. | B23K 37/0435 269/32 |
| 2008/0067729 A1 * | 3/2008 | McKown | ............... | B23Q 3/062 269/313 |
| 2014/0103591 A1 * | 4/2014 | Petit | ........................ | B62D 65/18 269/55 |

FOREIGN PATENT DOCUMENTS

| | | |
|---|---|---|
| DE | 102013004598 A1 | 9/2014 |
| JP | S61-259853 A | 11/1986 |
| JP | H04-336997 A | 11/1992 |
| JP | 2009-072891 A | 4/2009 |
| JP | 2013-198918 A | 10/2013 |
| JP | 2015-030348 A | 2/2015 |

OTHER PUBLICATIONS

PCT/ISA/237, "Written Opinion of the International Searching Authority for International Application No. PCT/JP2016/084131," dated Feb. 7, 2017.
"A story toward making a jumbo jet airliner Boeing "777" (1) [in Gifu Works/Nagoya Works 1] Make a fuselage panel," Kawasaki News, Kawasaki Heavy Industries, Ltd., Public Relations Office, Apr. 2005, p. 1-7, No. 138.
Europe Patent Office, "Search Report for European Patent Application No. 16889385.7," dated Nov. 7, 2018.
Japan Patent Office, "Office Action for Japanese Patent Application No. 2016-018427," dated Dec. 27, 2018.

* cited by examiner

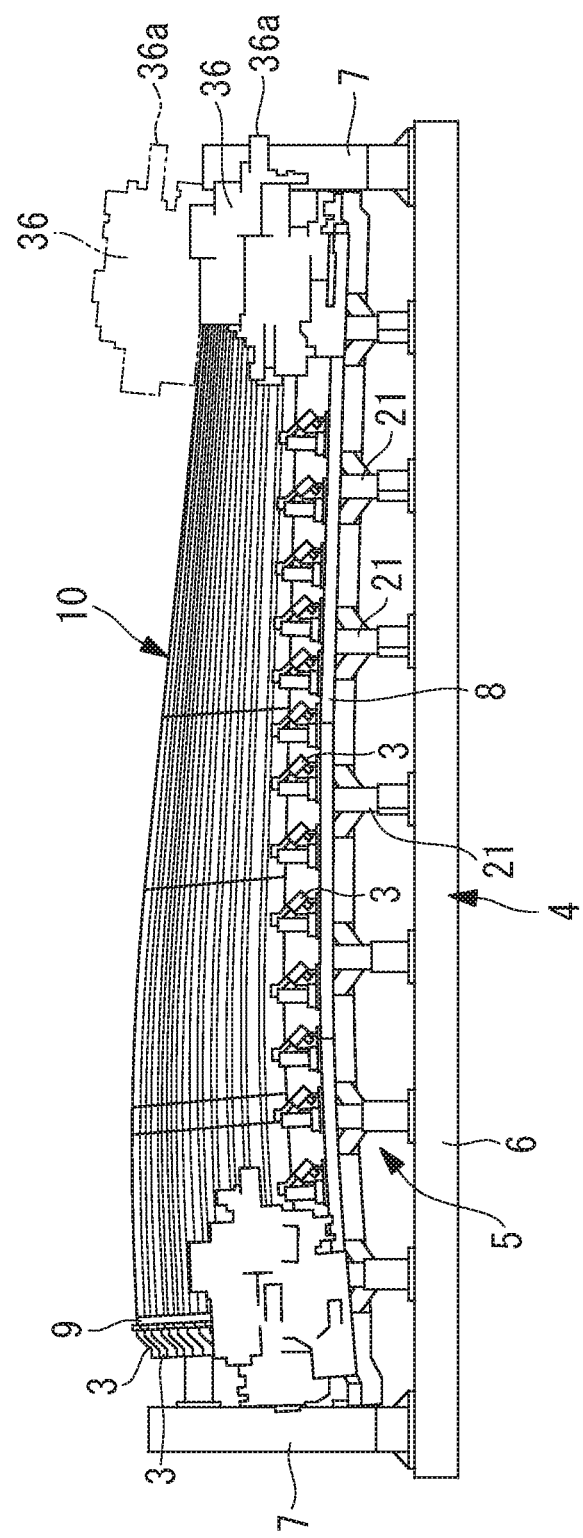

HOLDING FIXTURE

RELATED APPLICATIONS

The present application is National Phase of International Application No. PCT/JP2016/084131 filed Nov. 17, 2016, and claims priority from Japanese Application No. 2016-018427, filed Feb. 2, 2016, the disclosure of which is hereby incorporated by reference herein in its entirety.

TECHNICAL FIELD

The present invention relates to a holding fixture.

BACKGROUND ART

A fuselage panel of an aircraft is formed by combining: plate-like skins having a curved surface; long stringers which are mounted on the skins along a longitudinal direction of a fuselage; frames which are mounted along a circumferential direction of a fuselage; and other elements.

Joining of overlapping portions of skins disposed adjacent to each other and joining of the frames with respect to the skin or the stringer is performed after the position of respective components is accurately determined using a positioning fixture. Rivets are used for joining the components. With the use of the positioning fixture, the respective components can be joined to the skin having low rigidity at an accurate position.

CITATION LIST

Non Patent Literature

[NPL 1] "A story toward making a jumbo jet airliner Boeing "777" (1) [in Gifu Works/Nagoya Works 1] Make a fuselage panel", Kawasaki News, Kawasaki Heavy Industries, Ltd. Public Relations Office, April 2005, No. 138, p. 1-7

SUMMARY OF INVENTION

Technical Problem

Conventionally, the positioning fixtures are used in a fixed state at predetermined positions in a plant and hence, the above-mentioned joining of the skins and joining of the frames are performed at the predetermined positions so as to manufacture a fuselage panel. The timing at which the fuselage panel is moved during the manufacture is limited to when the fuselage panel is moved from one positioning fixture to another positioning fixture or when the fuselage panel is moved from a work location in one step to a work location in a next step. The positioning fixtures per se are not moved.

Further, the conventional positioning fixture is provided with a large number of positioning members which correspond to respective frames of the fuselage panel and hence, the positioning fixture has a large overall weight. Therefore, a large amount of power is required for conveying the positioning fixture and hence, such a positioning fixture is inappropriate for being conveyed. Further, in the conventional positioning fixture, the large number of positioning members are arranged corresponding to intervals of the frames of a fuselage panel and hence, a range where the automatic riveting machine is applicable is limited. Accordingly, a proportion of the number of rivets which can be fastened using the automatic riveting machine to the total number of rivets is low.

The present invention has been made under such circumstance, and it is an object of the present invention to simplify the structure of the holding fixture which holds the shape of the aircraft panel, and to provide the holding fixture which can hold the aircraft panel in an appropriate shape.

Solution to Problem

A holding fixture according to one aspect of the present invention includes: a plurality of gripping units configured to grip edge portions on two opposite sides of an aircraft panel including a plate-like member; and a support body configured to integrally support the plurality of gripping units, the support body being provided corresponding to the aircraft panel to be gripped by the plurality of gripping units, wherein the plurality of gripping units hold the aircraft panel such that the gripping units grip the edge portions of the aircraft panel, and the aircraft panel has a curved shape in cross section taken in a direction perpendicular to a one axis direction, and the holding fixture is configured to be conveyable in a state of holding the aircraft panel.

With such a configuration, the aircraft panel including the plate-like member is gripped by the plurality of gripping units at the edge portions on two opposite sides of the aircraft panel, and the plurality of gripping units are integrally supported by the support body provided corresponding to the aircraft panel. At this point of operation, the aircraft panel is held so as to have a curved shape in cross section taken in the direction perpendicular to the one axis direction. The aircraft panel is gripped at the edge portions on two sides of the aircraft panel so that the shape of the aircraft panel is held and hence, the holding fixture can hold the aircraft panel with a simple structure. Further, the holding fixture is configured to be conveyable in a state of holding the aircraft panel and hence, the aircraft panel is conveyed in a state where the shape of the aircraft panel is held. The one axis direction means a longitudinal direction of an aircraft panel, for example. When the aircraft panel is a fuselage panel, the one axis direction is an axial direction of an aircraft.

In the above-mentioned aspect, the support body includes first support members each one of which is provided corresponding to each of two opposite sides of the aircraft panel along the one axis direction, and the plurality of gripping units supported by the first support members grip the aircraft panel at the edge portions on the two opposite sides of the aircraft panel which extend along the one axis direction.

With such a configuration, each one of the first support members is provided so as to extend along the one axis direction, for example, to extend in the direction parallel or oblique to the one axis direction. The first support member is provided corresponding to each of the two opposite sides of the aircraft panel. The plurality of gripping units are supported by the first support members, and the aircraft panel is gripped on two opposite sides of the aircraft panel by the plurality of gripping units supported by the first support members.

In the above-mentioned aspect, a position at which the first support member is fixed is variable in a circumferential direction about the one axis of the aircraft panel conforming to a shape of the aircraft panel.

With such a configuration, the position at which the first support member is fixed is variable conforming to the shape of the aircraft panel. Accordingly, also in the case where an aircraft panel has a different size, the position of the plurality of gripping units is variable and hence, the plurality of gripping units can grip the aircraft panel.

In the above-mentioned aspect, the support body includes second support members each one of which is provided in a plane in a direction perpendicular to the one axis direction, and which is provided conforming to a curved shape of each of two opposite sides of the aircraft panel, and the aircraft panel is placed on the second support members at edge portions on the two opposite sides of the aircraft panel which extend along a circumferential direction about the one axis.

With such a configuration, each one of the second support members is provided in a plane in the direction perpendicular to the one axis direction, and the second support member is provided conforming to a curved shape of each of the two opposite sides of the aircraft panel which extend along a circumferential direction about the one axis. The plurality of gripping units are supported by the second support members, and the aircraft panel is gripped on the two opposite sides of the aircraft panel by the plurality of gripping units supported by the second support members.

In the above-mentioned aspect, the support body includes second support members each one of which is provided in a plane in the direction perpendicular to the one axis direction, and which is provided conforming to a curved shape of each of the two opposite sides of the aircraft panel, and the plurality of gripping units supported by the second support members grip the aircraft panel on the two opposite sides of the aircraft panel which extend along a circumferential direction about the one axis.

With such a configuration, each one of the second support members is provided in a plane in the direction perpendicular to the one axis direction. The second support member is provided conforming to a curved shape of each of the two opposite sides of the aircraft panel which extend along a circumferential direction about the one axis. The plurality of gripping units are supported by the second support members, and the aircraft panel is gripped on two opposite sides of the aircraft panel by the plurality of gripping units supported by the second support members.

In the above-mentioned aspect, a position at which the second support member is fixed is variable along the one axis direction conforming to a shape of the aircraft panel.

With such a configuration, the position at which the second support member is fixed is variable along the one axis direction conforming to the shape of the aircraft panel. Accordingly, also in the case where an aircraft panel has a different size in the one axis direction, the plurality of gripping units can grip the aircraft panel.

In the above-mentioned aspect, the plate-like member of the aircraft panel has a cut-out portion, and the holding fixture further includes: a plurality of second gripping units configured to grip an edge portion of the cut-out portion; and a second support body configured to support the plurality of second gripping units, the second support body being provided corresponding to the edge portion of the cut-out portion which is to be gripped by the plurality of second gripping units.

With such a configuration, in the aircraft panel where the plate-like member has the cut-out portion, the edge portion of the cut-out portion of the aircraft panel is gripped by the plurality of second gripping units, and the plurality of second gripping units are supported by the second support body provided corresponding to the cut-out portion. Accordingly, it is possible to reduce the amount of deformation of the plate-like member at locations around the cut-out portion.

In the above-mentioned aspect, the gripping unit is formed of a toggle clamp which uses a toggle mechanism, and the gripping unit includes a rod-shaped pressing portion configured to press the aircraft panel, and a drive unit configured to move the pressing portion.

With such a configuration, the gripping unit is formed using the toggle clamp. The drive unit moves the rod-shaped pressing portion causing the pressing portion to press the aircraft panel. With such operations, the gripping unit grips the aircraft panel.

Advantageous Effects of Invention

According to the present invention, the aircraft panel is gripped at the edge portions on two opposite sides of the aircraft panel, and the aircraft panel is integrally held by the support body. Accordingly, it is possible to simplify the structure of the holding fixture which holds the aircraft panel, and to hold the aircraft panel in an appropriate shape.

BRIEF DESCRIPTION OF DRAWINGS

FIG. 10 is a perspective view showing a second modification of the holding fixture according to the first embodiment of the present invention.

DESCRIPTION OF EMBODIMENTS

Hereinafter, embodiments according to the present invention are described with reference to drawings.

First Embodiment

A holding fixture 1 according to a first embodiment of the present invention is used for holding the shape of an aircraft panel in a predetermined shape in joining skins which form the aircraft panel to each other by rivets in an overlapping state, or in joining a frame to the skin or a stringer by rivets, for example.

Hereinafter, the description is made with respect to a method for manufacturing a fuselage panel 10 of an aircraft. However, the present invention is not limited to this embodiment. For example, the present invention is also applicable to a method for manufacturing an aircraft member other than the fuselage panel 10, such as a wing.

Figure 1:
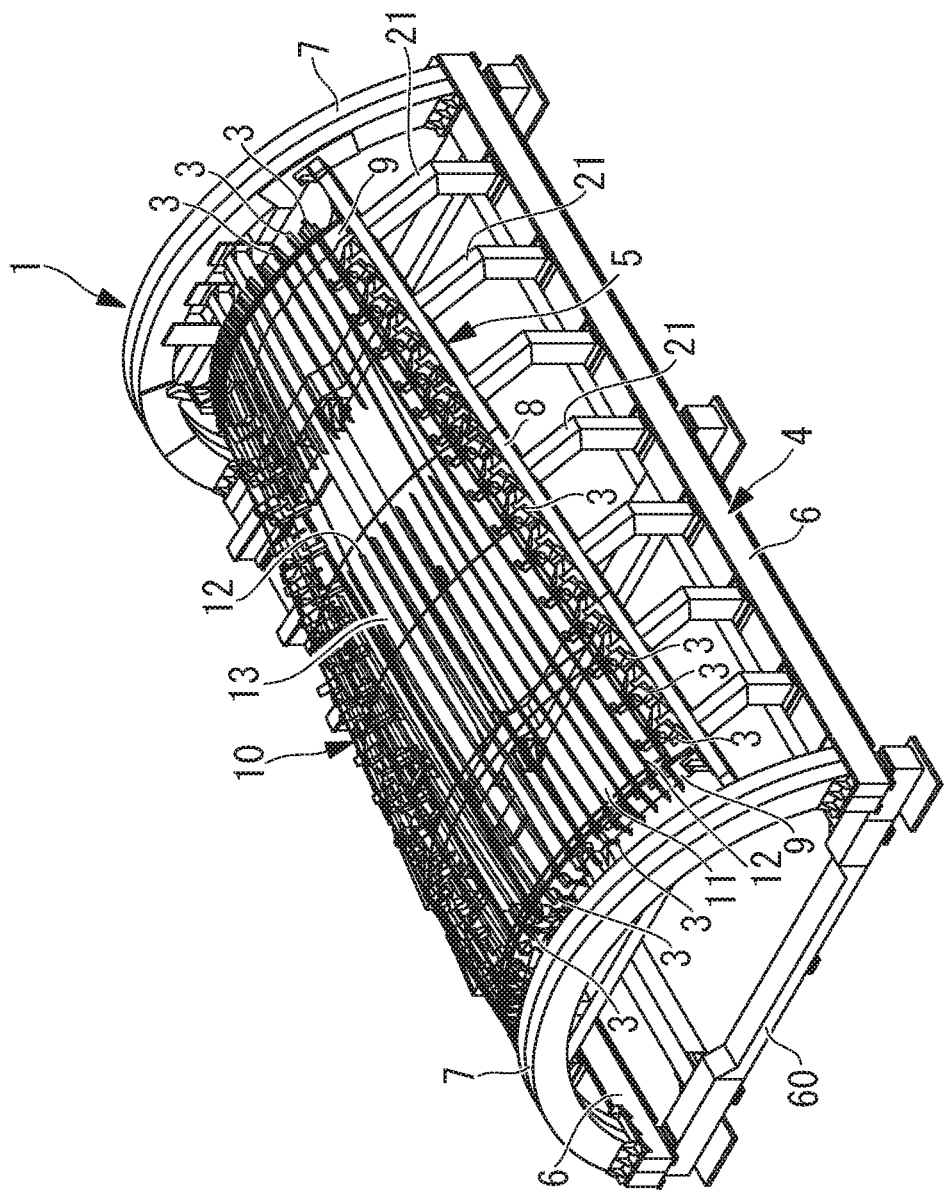
FIG. 1 is a perspective view showing a holding fixture according to a first embodiment of the present invention, a fuselage panel placed on the holding fixture, and a fixing base on which the holding fixture is placed.

As shown in FIG. 1, the fuselage panel 10 of the aircraft is formed by combining: plate-like skins 11 having a curved surface; long stringers 12 which are mounted on the skins 11 along the one axis direction of a fuselage, that is, along the axial direction (longitudinal direction) of the aircraft; frames (not shown in the drawing) which are mounted along the circumferential direction of the fuselage; and other elements. The fuselage panel 10 is made of aluminum or an aluminum alloy, for example. For one example of size, the length in the longitudinal direction is 10 m, the arc length is 6 m, and the plate thickness is from 2 mm to 5 mm.

In a step where the holding fixture 1 according to this embodiment holds the fuselage panel 10, the fuselage panel 10 has a shape which is obtained by dividing a substantially cylindrical fuselage portion of the aircraft in the axial direction and in the circumferential direction. Accordingly, the fuselage panel 10 has an arc shape in cross section taken in the direction perpendicular to the axial direction. The fuselage panel 10 has two opposite sides which extend parallel or oblique to the axial direction, and the two sides are positioned at lower edges of the fuselage panel 10 in a state where the fuselage panel 10 is held by the holding fixture 1. The fuselage panel 10 also has two opposite sides each of which is provided in a plane perpendicular to the axial direction, and the two sides have an arc shape, and are positioned at side edges of the fuselage panel 10 in a state where the fuselage panel 10 is held by the holding fixture 1.

The holding fixture 1 is configured to be conveyable. For example, the holding fixture 1 is placed on a conveying apparatus (not shown in the drawing) such as a chain conveyor or a belt conveyor, and is conveyed from one end side to the other end side of the conveying apparatus. A chain, a belt or the like of the conveying apparatus is driven by a motor, and the chain, the belt or the like is wound parallel to horizontal members 6 of the holding fixture 1. The holding fixture 1 is made of aluminum or an aluminum alloy, for example. FIG. 1 shows a state where the holding fixture 1 is fixed to a fixing base 60.

The holding fixture 1 has a shape where a plurality of gripping units 3 are supported by a support body 5 so that the gripping units 3 and the support body 5 are formed into an integral body with a fixed relative position, and bottom portions of the two horizontal members 6 are disposed on the same plane. With such a configuration, the holding fixture 1 can be conveyed by the conveying apparatus.

While the holding fixture 1 is being moved by the conveying apparatus, a rivet fastening operation is not performed on the fuselage panel 10. The rivet fastening operation is performed on the fuselage panel 10 in a state where the holding fixture 1 is fixed at one position. For example, an automatic riveting machine is installed at a predetermined place and, when rivet fastening performed by this automatic riveting machine is completed, the holding fixture 1 is conveyed to another place by the conveying apparatus. At the place to which the holding fixture 1 is conveyed, another automatic riveting machine is installed, and rivet fastening is performed by another automatic riveting machine. Alternatively, the place to which the holding fixture 1 is conveyed is a work location where an operator performs an operation, and rivet fastening, inspection or the like is manually performed.

Figure 2:
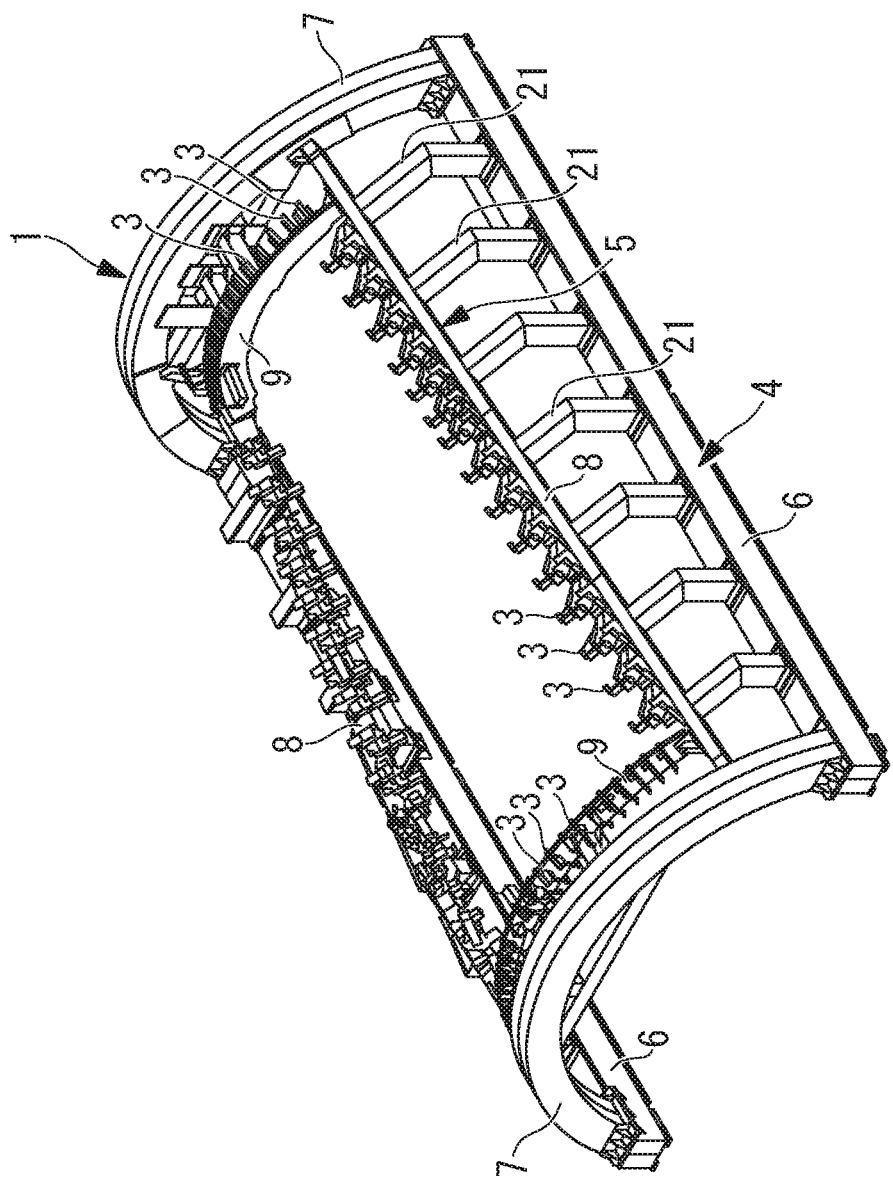
FIG. 2 is a perspective view showing the holding fixture according to the first embodiment of the present invention.

As shown in FIG. 1 and FIG. 2, the holding fixture 1 according to this embodiment includes a frame member 4, the support body 5, the gripping units 3 and the like. When the fuselage panel 10 is held by the holding fixture 1, the fuselage panel 10 is held so as to project upward.

The frame member 4 is formed of: the two straight horizontal members 6 which extend in one direction; two arch members 7 which are disposed between the two horizontal members 6, and formed into an arch shape; and other elements. The horizontal members 6 and the arch members 7 of the frame member 4 support the support body 5 described later.

The horizontal members 6 are arranged so as to extend along the axial direction of the fuselage panel 10 to be set on the holding fixture 1, for example, to extend parallel to the axial direction of the fuselage panel 10. Lower edges of the arch members 7 are joined to end portions at one end of the horizontal members 6 and to end portions at the other end of the horizontal members 6. With such a configuration, the holding fixture 1 has a substantially saddle shape formed of the two horizontal members 6 and the two arch members 7.

In the holding fixture 1 of this embodiment, end portions at one end of the two horizontal members 6 are joined, and the end portions at the other end of the two horizontal members 6 are joined. Cross beam members which extend in the direction perpendicular to the horizontal members 6 are not provided to the holding fixture 1. With such a configuration, in a state where the fuselage panel 10 is set on the holding fixture 1, it is possible to ensure a work space which extends along the axial direction below the fuselage panel 10 without being interrupted by the cross beam members.

The length of the horizontal members 6 is set longer than the length in the axial direction of the fuselage panel 10 to be manufactured by rivet fastening. An arrangement interval between the two horizontal members 6 is set longer than the arc length of the fuselage panel 10 to be manufactured by rivet fastening.

Each arch member 7 has a curved shape, and forms the frame member 4. The arch member 7 is arranged in a plane in the direction perpendicular to the axial direction of the fuselage panel 10 to be set on the holding fixture 1. One arch member 7 is provided to ends on one side of the horizontal members 6, and another arch member 7 is provided to ends on the other side of the horizontal members 6. The arch members 7 are joined to the two horizontal members 6. Accordingly, the frame member 4 has a configuration where the horizontal members 6 and the arch members 7 are formed into an integral body. The curved shape of the arch members 7, for example, the curvature of the arch members 7 is set substantially corresponding to the curvature of the fuselage panel 10 to be manufactured.

The support body 5 is formed of: two straight lower edge support members 8 which extend in the axial direction; two side edge support members 9 which are disposed between the two lower edge support members 8, and are formed into an arch shape; and other elements.

The lower edge support members 8 support lower edges of the fuselage panel 10 by means of the gripping units 3. The lower edge support members 8 are positioned above the horizontal members 6 of the frame member 4. The lower edge support members 8 are arranged so as to extend along the axial direction of the fuselage panel 10 to be set on the holding fixture 1, for example, to extend in the direction parallel or oblique to the axial direction of the fuselage panel 10. The lower edge support members 8 are respectively arranged corresponding to two opposite sides of the fuselage panel 10 to be set on the holding fixture 1. For example, the lower edge support members 8 are arranged so as to extend along straight edge portions on two opposite sides of the fuselage panel 10.

For example, assume a case where the fuselage panel 10 to be manufactured has a single curved surface with a constant curvature along the axial direction. In such a case, when the fuselage panel 10 is set on the holding fixture 1 such that an axis of the fuselage panel 10 extends parallel to a horizontal plane, the extending direction of the lower edge support members 8 and the extending direction of the horizontal members 6 are parallel to each other. On the other hand, assume a case where the fuselage panel 10 to be manufactured has a double curved surface with a varying curvature along the axial direction. In such a case, when the fuselage panel 10 is set on the holding fixture 1 such that an axis of the fuselage panel 10 extends parallel to a horizontal plane, the extending direction of the lower edge support members 8 extends oblique with respect to the extending direction of the horizontal members 6.

Further, when the fuselage panel 10 to be manufactured has a double curved surface, the fuselage panel 10 may be set on the holding fixture 1 such that the axis of the fuselage panel 10 extends obliquely with respect to a horizontal plane so that an uppermost portion of the fuselage panel 10 on the holding fixture 1 extends substantially parallel to the horizontal plane along the axial direction. That is, the fuselage panel 10 is set on the holding fixture 1 such that the center of the edge of the fuselage panel 10 on the side having a smaller radius in transverse cross section is positioned higher than the center of the edge of the fuselage panel 10 on the side having a larger radius in transverse cross section. With such a configuration, a distance from each gate-shaped automatic riveting machine 32 (see FIG. 5) to the fuselage panel 10 is set to be substantially uniform in the axial direction of the fuselage panel 10.

Each lower edge support member 8 is supported by the horizontal member 6 by way of auxiliary members 21 disposed between the lower edge support member 8 and the horizontal member 6, for example. The auxiliary member 21 is a member having one end portion thereof connected to the horizontal member 6, and the other end portion thereof connected to the lower edge support member 8. The plurality of auxiliary members 21 are arranged along the longitudinal direction of the horizontal member 6 and the lower edge support member 8.

The plurality of gripping units 3 are arranged on the lower edge support member 8 at intervals. The length of the lower edge support member 8 is set longer than the length in the axial direction of the fuselage panel 10 to be manufactured. An arrangement interval between the two lower edge support members 8 is set longer than the arc length of the fuselage panel 10 to be manufactured. Further, the lower edge support members 8 are positioned below the fuselage panel 10 to be held so as to allow the gripping units 3 to support the lower edge portions of the fuselage panel 10 from below.

Lower ends of the side edge support members 9 are joined to one end portions and the other end portions of the lower edge support members 8 in the longitudinal direction.

The side edge support members 9 support side edges of the fuselage panel 10 by means of the gripping units 3. Each side edge support member 9 is a member having a curved shape. The side edge support member 9 is arranged in a plane in the direction perpendicular to the axial direction of the fuselage panel 10 to be set on the holding fixture 1. The side edge support members 9 are respectively arranged corresponding to two opposite sides of the fuselage panel 10 to be set on the holding fixture 1.

One side edge support member 9 is provided to ends on one side of the lower edge support members 8 in the longitudinal direction, and another side edge support member 9 is provided to ends on the other side of the lower edge support members 8 in the longitudinal direction. The side edge support members 9 are joined to the two lower edge support members 8. Accordingly, the support body 5 has a configuration where the lower edge support members 8 and the side edge support members 9 are formed into an integral body. The curved shape of the side edge support members 9, for example, the curvature of the side edge support members 9 is set according to the curvature of the fuselage panel 10 to be manufactured. A plurality of gripping units 3 having substantially the same configuration as the above-mentioned gripping units 3 may be provided to the side edge support members 9, and the gripping units 3 may grip and support the side edges of the fuselage panel 10.

At this point of operation, the plurality of gripping units 3 mounted on each side edge support member 9 are disposed at intervals at positions which correspond to the curvature of the fuselage panel 10 to be manufactured. Accordingly, when the plurality of gripping units 3 grip the fuselage panel 10, the fuselage panel 10 gripped by the gripping units 3 is held so as to have the curvature of the fuselage panel 10 to be manufactured.

For example, assume a case where the fuselage panel 10 to be manufactured has a single curved surface with a constant curvature along the axial direction. In such a case, the curvature obtained by connecting the gripping units 3 on the side edge support member 9 on one edge side is equal to the curvature obtained by connecting the gripping units 3 on the side edge support member 9 on the other edge side. On the other hand, assume a case where the fuselage panel 10 to be manufactured has a double curved surface with a varying curvature along the one axis direction. In such a case, the curvature obtained by connecting the gripping units 3 on the side edge support member 9 on one edge side is larger than the curvature obtained by connecting the gripping units 3 on the side edge support member 9 on the other edge side.

In the above-mentioned description, the lower edge support members 8 and the side edge support members 9 are fixed to the frame member 4, and the fuselage panel 10 which the holding fixture 1 holds has a predetermined size. However, the present invention is not limited to this embodiment. At least either one of the lower edge support member 8 or the side edge support member 9 may be configured to be movable.

Figure 3A:
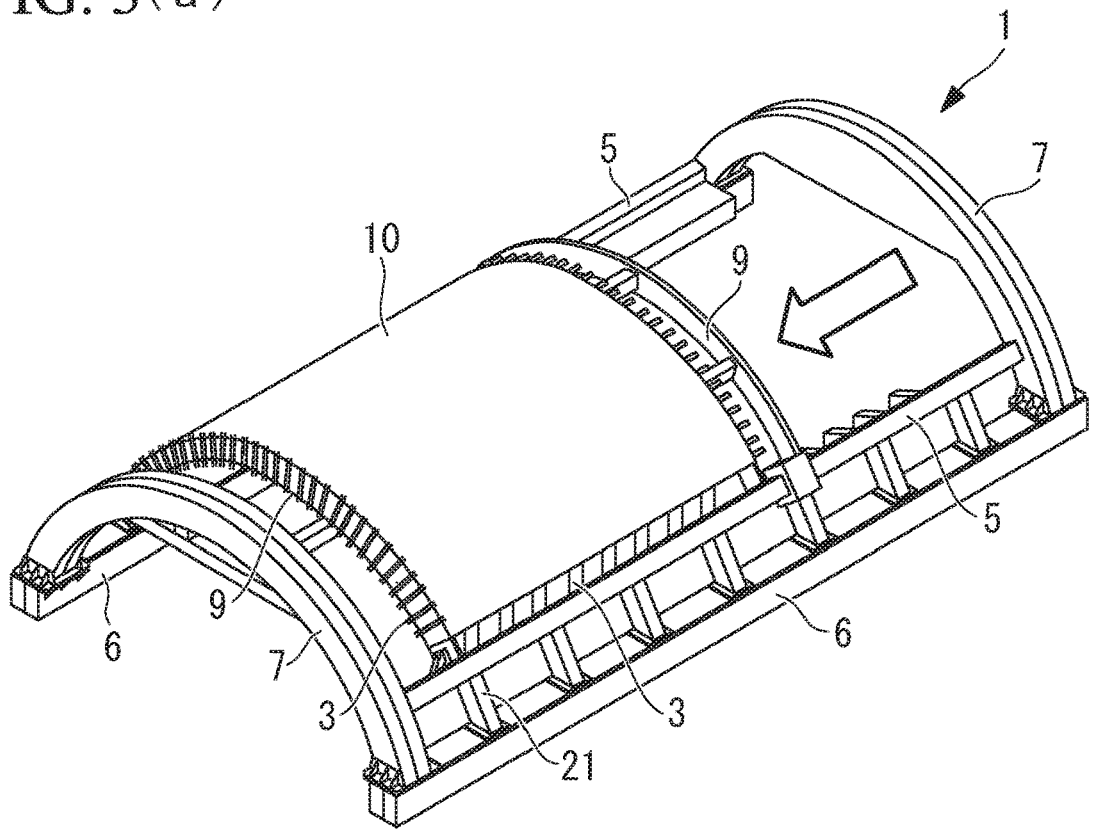
FIGS. 3(a) and 3(b) are perspective views showing a first modification of the holding fixture according to the first embodiment of the present invention.
Figure 3B:
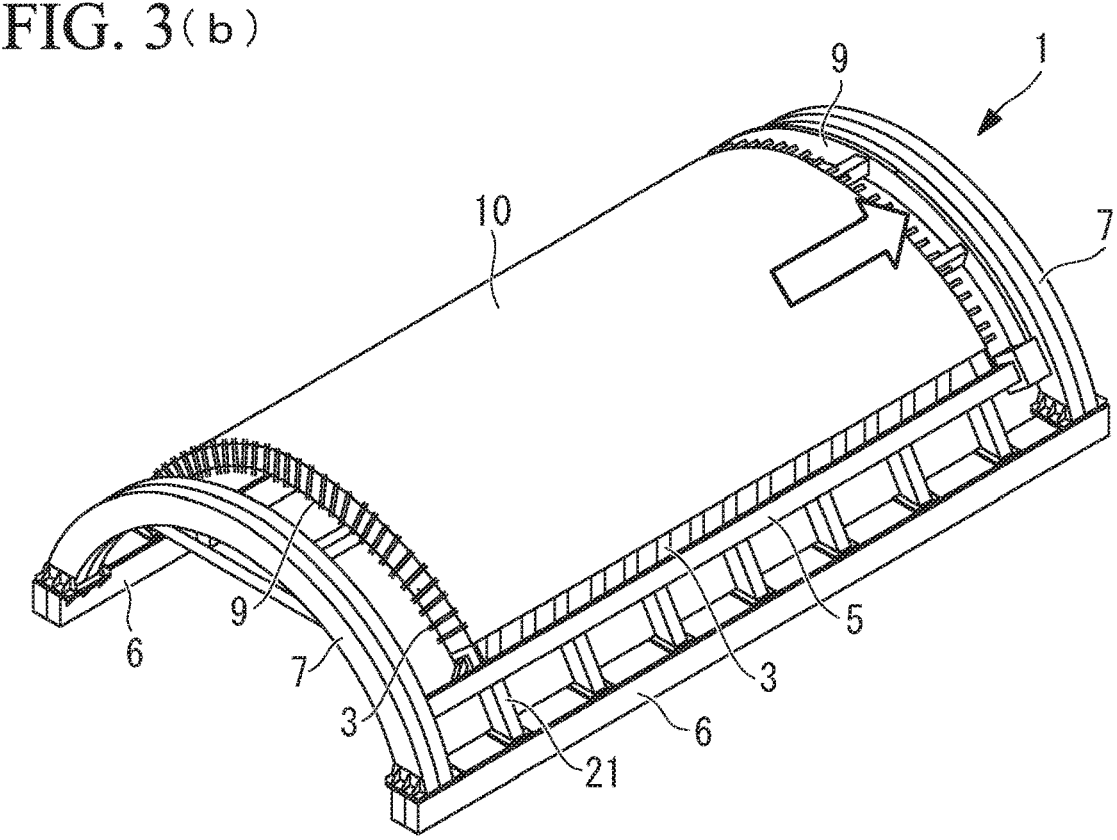

For example, as shown in FIGS. 3(*a*) and 3(*b*), the position at which the side edge support member 9 is fixed may be variable along the axial direction of the fuselage panel 10 conforming to the shape of the fuselage panel 10 to be held. For example, as shown in FIG. 3(*a*), the side edge support member 9 may be disposed at the position close to an intermediate portion of the holding fixture 1 in the axial direction. Alternatively, as shown in FIG. 3(*b*), the side edge support member 9 may be disposed at the position close to an edge portion of the holding fixture 1 in the axial direction. With such a configuration, even when the fuselage panel 10 has a different length in the axial direction, the position of the side edge support member 9 is variable and hence, the side edge support member 9 allows the fuselage panel 10 to be placed on the holding fixture 1. Accordingly, one holding fixture 1 allows a variety of aircraft panels to be placed thereon.

Alternatively, the position at which the lower edge support member 8 is fixed may be variable in the circumferential direction of the fuselage panel 10 conforming to the shape of the fuselage panel 10 to be held. With such a configuration, even when the fuselage panel 10 has a different arc length, the positions of the plurality of gripping units 3 are variable and hence, the plurality of gripping units 3 can grip the fuselage panel 10. Accordingly, one holding fixture 1 can grip a variety of aircraft panels.

Figure 7:
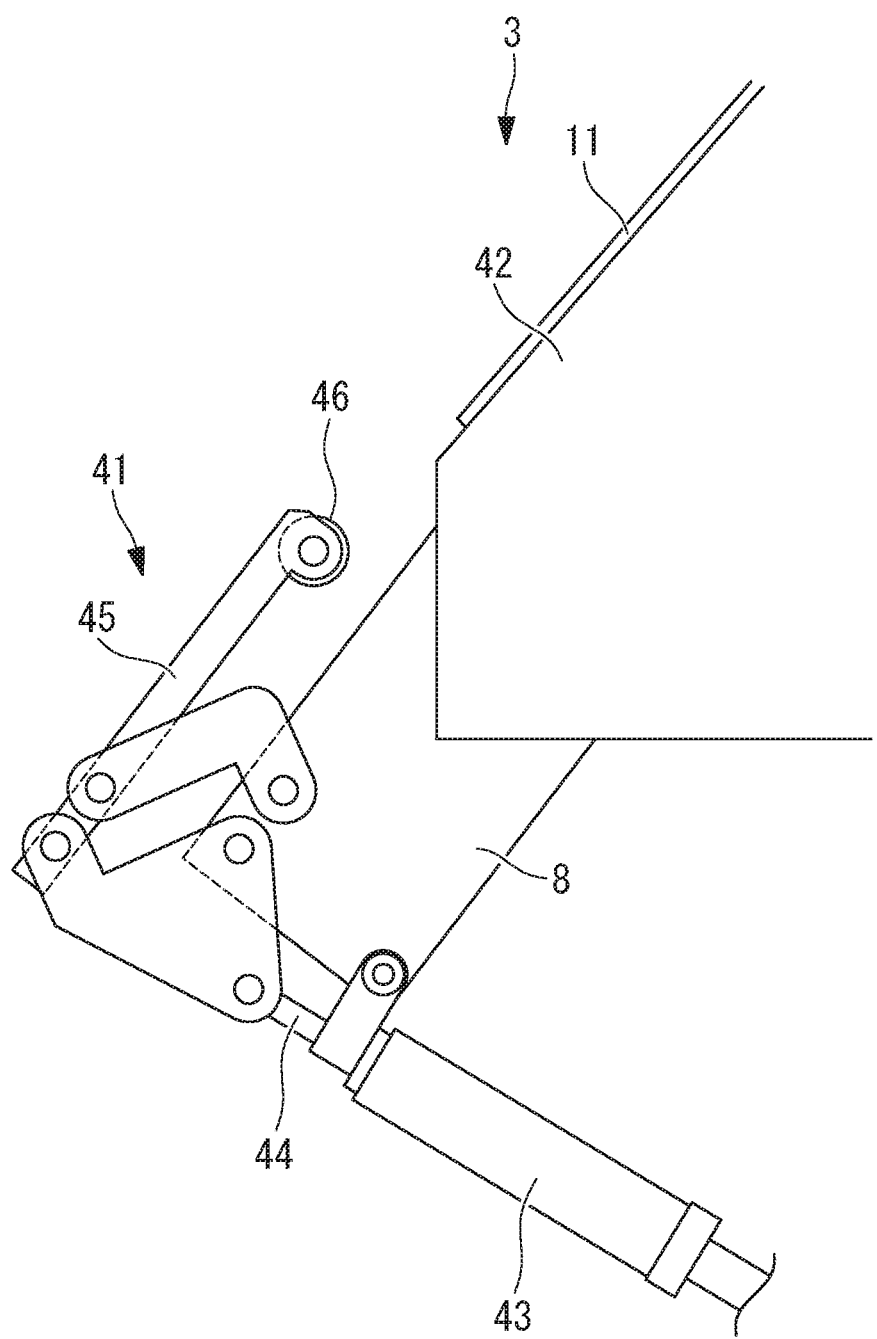
FIG. 7 is a perspective view showing a gripping unit of the holding fixture according to the first embodiment of the present invention, and is also a view showing a state where a pressing portion of the gripping unit is separated from a skin of a fuselage panel.
Figure 8:
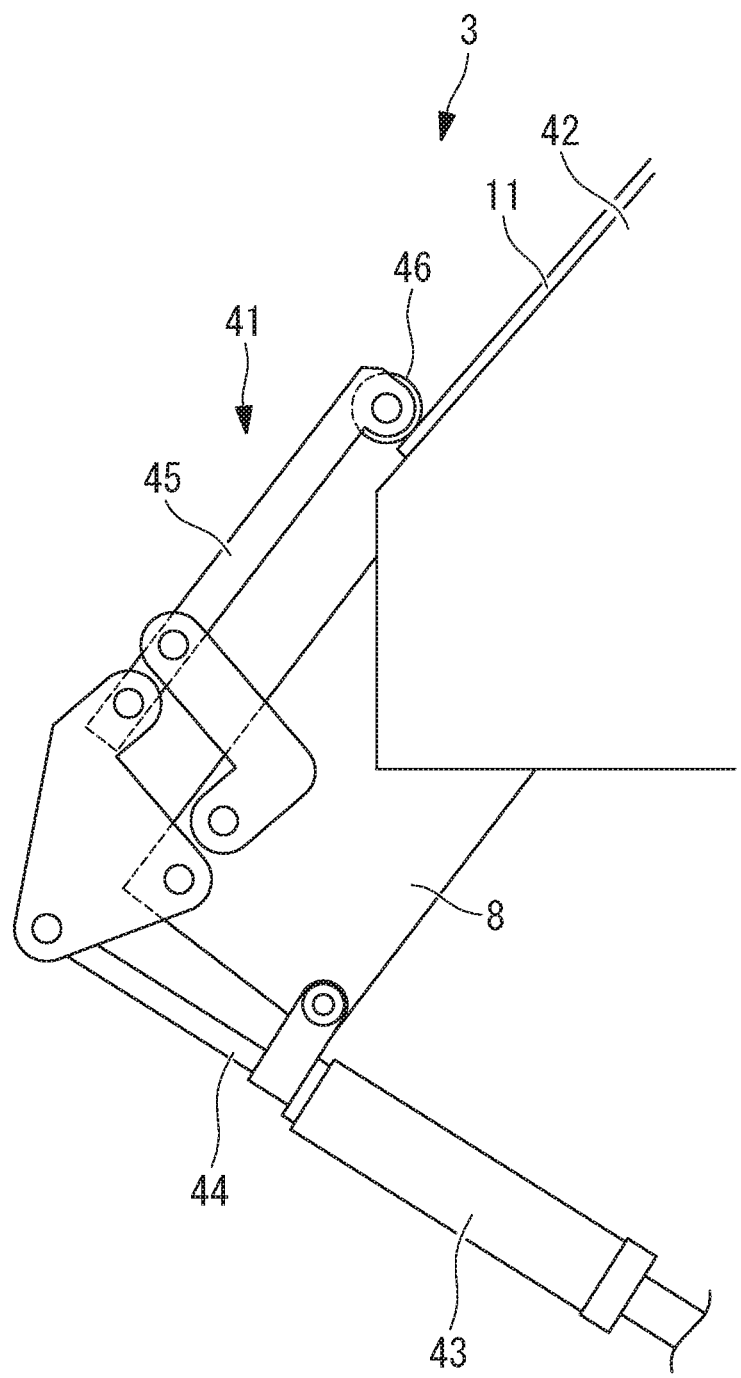
FIG. 8 is a perspective view showing the gripping unit of the holding fixture according to the first embodiment of the present invention, and is also a view showing a state where the pressing portion of the gripping unit presses the skin of the fuselage panel.

Each gripping unit 3 is configured to grip the edge portion of the fuselage panel 10 having the skin 11. The plurality of gripping units 3 are mounted at predetermined intervals. The gripping units 3 are supported by the lower edge support members 8 or the side edge support members 9. As shown in FIG. 7 and FIG. 8, the gripping unit 3 includes a toggle clamp 41, a receiving portion 42, and other elements, for example. The toggle clamp 41 is a clamp which uses a toggle mechanism. The toggle clamp 41 is formed of: a cylinder 43 which is fixed to the lower edge support member 8 or the side edge support member 9; a rod-shaped pressing portion 45 which is moved by a cylinder rod 44 provided to the cylinder 43; and other elements. The cylinder 43 is one example of a drive unit.

A roller 46 is provided to a distal end of the pressing portion 45. The roller 46 is rotatable using the direction perpendicular to the moving direction of the pressing portion 45 as an axis of rotation. With such a configuration, as shown in FIG. 8, when the pressing portion 45 comes into contact with the fuselage panel 10 so as to grip the fuselage panel 10 by the gripping unit 3, a force acting in the in-plane direction of the fuselage panel 10 is changed to a force in the thickness direction of the fuselage panel 10. As a result, deformation of the fuselage panel 10 can be suppressed.

As shown in FIG. 8, when the cylinder rod 44 extends from the inside of a body of the cylinder 43, the pressing portion 45 presses an edge portion of the skin 11 of the fuselage panel 10 from one surface side (outer surface side) of the skin 11. A receiving portion 42 which receives a pressing force generated by the pressing portion 45 is provided on the other surface side (inner surface side) of the skin 11. The receiving portion 42 is fixed to the lower edge support member 8, for example.

On the other hand, as shown in FIG. 7, when the cylinder rod 44 is accommodated in the body of the cylinder 43, the pressing portion 45 is separated from the skin 11. At this point of operation, to allow the placement of the fuselage panel 10 on the holding fixture 1 or the removal of the fuselage panel 10 from the holding fixture 1, the pressing portion 45 retracts to the position which does not interfere with the fuselage panel 10. The cylinder 43 is coupled to a compressor, and a piston coupled to the cylinder rod 44 is driven by air pressure, for example.

The number of gripping units 3 to be provided and the gripping force applied to the skin 11 are determined through a simulation or a verification test such that displacement and vibration of the fuselage panel 10 can be prevented at the time of performing rivet fastening operations.

Figure 4:
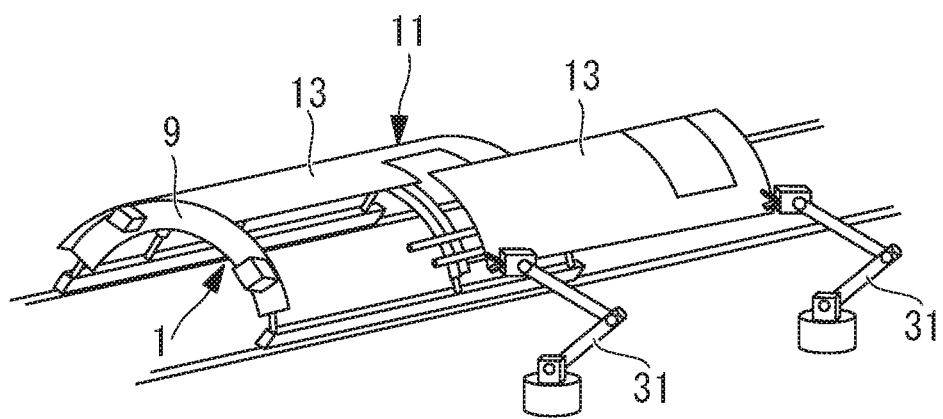
FIG. 4 is a schematic perspective view showing the holding fixture according to the first embodiment of the present invention and divided-panel mounting robots.

When the above-mentioned holding fixture 1 according to this embodiment holds the fuselage panel 10, first, as shown in FIG. 4, a divided panel 13 is lifted by divided-panel mounting robots 31 or the like, and the divided panel 13 is placed on a vacant holding fixture 1, on which no panel is placed, at a predetermined position of the side edge support member 9 of the holding fixture 1. The divided panel 13 is a member before the fuselage panel 10 is fastened by riveting, and is a member obtained by dividing the fuselage panel 10 into a plurality of elements. The divided panels 13 are members which extend in the direction parallel to the axial direction, for example, and obtained by dividing the fuselage panel 10 into a plurality of elements in the circumferential direction. The divided panels 13 are members obtained by dividing the fuselage panel 10 into four elements in the circumferential direction, for example.

When the plurality of divided panels 13 are placed on the holding fixture 1, the skins 11 of the divided panels 13 disposed adjacent to each other are made to overlap with each other on the holding fixture 1. That is, an edge portion of the skin 11 of one divided panel 13 is placed on an edge portion of the skin 11 of the other divided panel 13. Then, overlapping portions of the skins 11 are temporarily fastened by rivets.

The fuselage panel 10 on which temporary fastening is performed is fixed by the gripping units 3 mounted on the lower edge support members 8. At this point of operation, to hold the shape of the fuselage panel 10, the fuselage panel 10 may be held from below using an initial shape holding fixture (not shown in the drawing) which is different from the holding fixture 1.

The fuselage panel 10 on which the temporary fastening is performed and which is fixed by the gripping units 3 is moved to a next step in a state where the fuselage panel 10 is set on the holding fixture 1. The holding fixture 1 is moved by a conveyor positioned at a bottom portion of the holding fixture 1, for example. In the case where the initial shape holding fixture is used, the initial shape holding fixture is removed from the fuselage panel 10 when the holding fixture 1 is moved. According to this embodiment, the holding fixture 1 holds the fuselage panel 10 such that the shape of the completed fuselage panel 10 is held also in such a state.

On the fuselage panel 10 on the holding fixture 1 which is moved, rivet fastening is performed by an automatic riveting machine, or is manually performed by an operator, for example.

Figure 5:
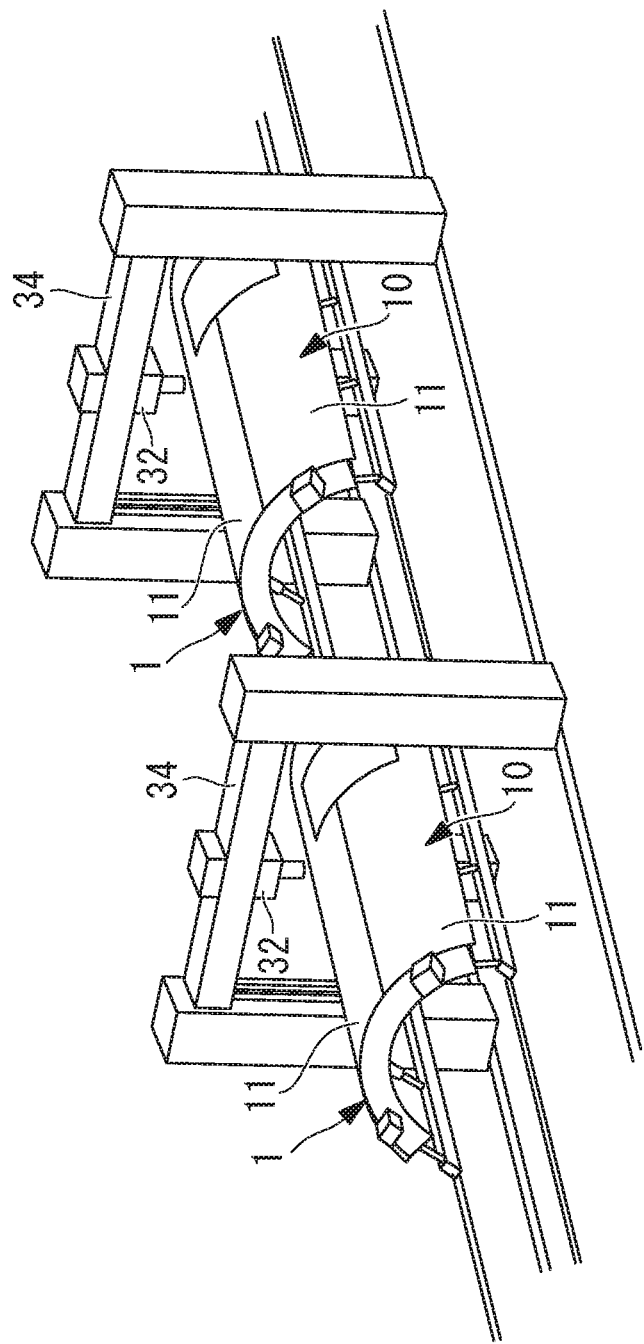
FIG. 5 is a schematic perspective view showing the holding fixture according to the first embodiment of the present invention and automatic riveting machines.
Figure 6:
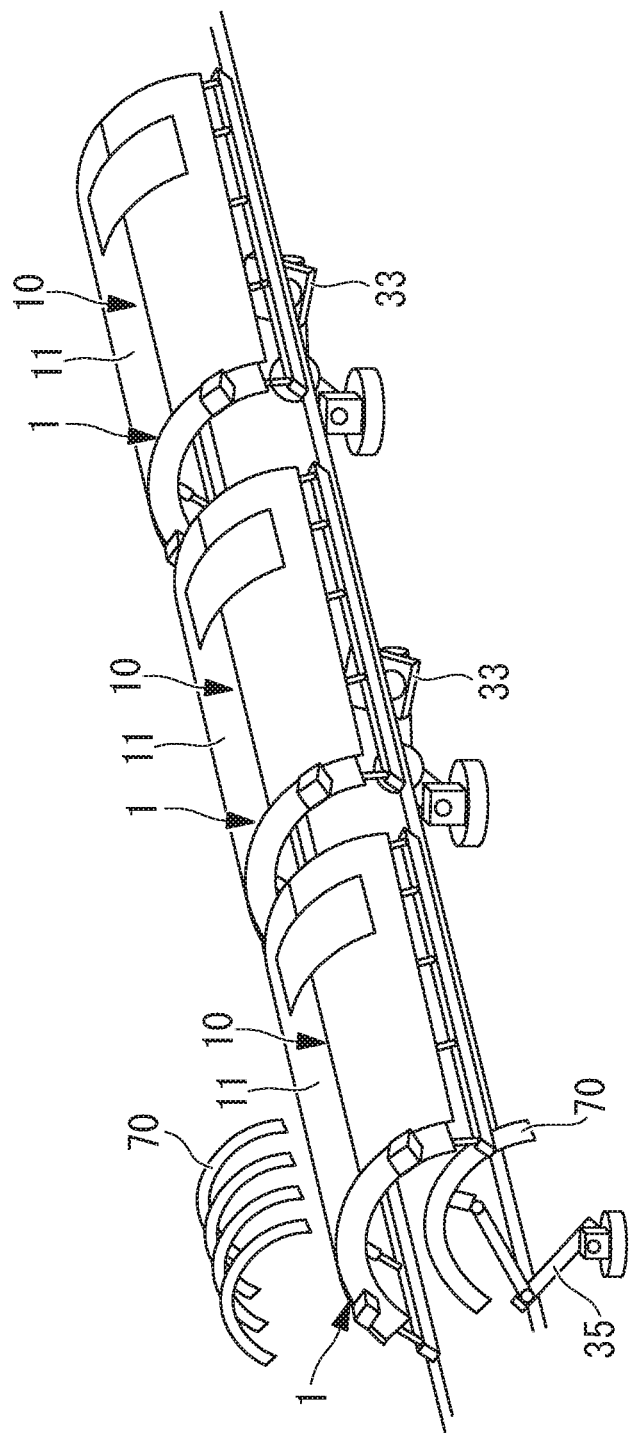
FIG. 6 is a schematic perspective view showing the holding fixture according to the first embodiment of the present invention, a frame mounting robot, and the automatic riveting machines.

A rivet fastening operation to be performed on the fuselage panel 10 placed on the holding fixture 1 includes an operation where, as shown in FIG. 5, the overlapping portions of the skins 11 disposed adjacent to each other are fastened by automatic riveting machines (for example, the gate-shaped automatic riveting machines 32 each having a gate-shaped frame 34). The rivet fastening operation also includes an operation where, as shown in FIG. 6, frames 70 are temporarily fastened to the inner surface side of the fuselage panel 10, that is, to a lower surface of the skin 11 of the fuselage panel 10 supported by the holding fixture 1 and the stringers 12 by a mounting robot 35 and, thereafter, the frames 70 are fastened to the lower surface of the skin 11 and the stringers 12 by automatic riveting machines 33. In addition to the above-mentioned operations, attachment of a hinge of an aircraft door which is to be attached to the fuselage panel 10, attachment of a bracket for wiring and piping or attachment of a bracket for installing a sensor is performed through rivet fastening operations which are manually performed.

The fuselage panel 10 where rivet fastening is completed is moved to a next step in a state where the fuselage panel 10 is set on the holding fixture 1. After the rivet fastening is completed, an adjustment is performed based on inspection or the results of inspection. The fuselage panel 10 where the inspection and the adjustment are completed is hoisted by a crane or the like, and is removed from the holding fixture 1 according to this embodiment. Thereafter, the fuselage panel 10 is placed on another fixture, and coating or the like is performed on the fuselage panel 10.

As described above, the holding fixture 1 according to this embodiment supports the fuselage panel 10 at the edge portions of the fuselage panel 10. That is, the fuselage panel 10 having the skin 11 is gripped by the plurality of gripping units 3 at the edge portions of the fuselage panel 10 on two opposite sides (for example, two opposite sides which extend parallel to the axial direction). At this point of operation, the plurality of gripping units 3 are integrally supported by way of the support body 5 which is provided corresponding to the fuselage panel 10.

The fuselage panel 10 is held so as to have a curved shape in cross section taken in the direction perpendicular to the axial direction so that the fuselage panel 10 projects upward. The fuselage panel 10 is held from below the fuselage panel 10, for example, at the edge portions on two sides of the fuselage panel 10 and hence, the holding fixture 1 can hold the fuselage panel 10 with a simple structure. Further, the holding fixture 1 is configured to be conveyable in a state of holding the fuselage panel 10. For example, the frame member 4 and the support body 5 are formed into an integral body so that the holding fixture 1 has a shape where the bottom portions of the horizontal members 6 are disposed in the same plane. Accordingly, the holding fixture 1 can be conveyed in a state of holding the fuselage panel 10.

The holding fixture 1 of this embodiment has the structure of supporting the fuselage panel 10 at the edge portions of the fuselage panel 10. Accordingly, the holding fixture 1 of this embodiment is simplified and light-weighted compared to a conventional fixture where a plurality of positioning members are provided corresponding to a plurality of respective frames to be mounted on the fuselage panel 10. Accordingly, the fuselage panel 10 is movable together with the holding fixture 1 in a state where the fuselage panel 10 is held by the holding fixture 1. As a result, a rivet fasten operation may be performed by an automatic riveting machine or a rivet fasten operation may be manually performed, and inspection/an adjustment operation may be performed with respect to the fuselage panel 10 while moving the holding fixture 1 between different work locations.

Second Embodiment

Figure 9:
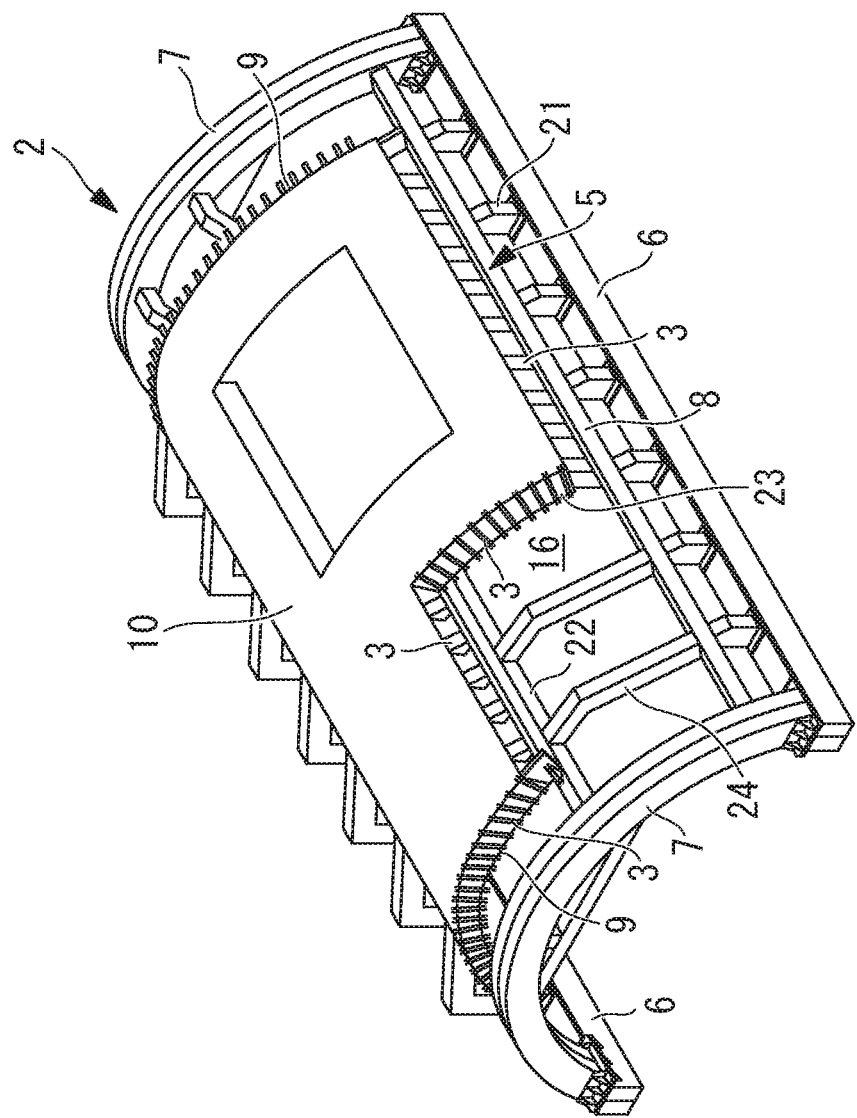
FIG. 9 is a perspective view showing a holding fixture according to a second embodiment of the present invention.

Next, a holding fixture according to a second embodiment of the present invention is described with reference to FIG. 9. The detailed description of constitutional elements and the operation and effect in this embodiment substantially equal to those in the first embodiment is omitted.

In the above-mentioned first embodiment, the description has been made with respect to the case where the fuselage panel 10 has a shape surrounded by the two opposite sides which extend parallel or oblique to the straight axial direction and the two opposite sides each of which has an arc shape and is provided in a plane perpendicular to the axial direction. However, the shape of the fuselage panel 10 which the holding fixture according to the present invention holds is not limited to such an embodiment.

For example, there may be a case where a cut-out portion 16 is formed in the fuselage panel 10 depending on the combination of a plurality of fuselage panels 10. A holding fixture 2 according to this embodiment can hold the fuselage panel 10 in which the cut-out portion 16 is formed as described above. In this case, in addition to the above-mentioned lower edge support members 8 or the side edge support members 9, a cut-out horizontal edge support member 22 and a cut-out side edge support member 23 are provided to the holding fixture 2. The cut-out horizontal edge support member 22 and the cut-out side edge support member 23 form a second support body. The cut-out horizontal edge support member 22 is supported by the horizontal member 6 or the lower edge support member 8, for example, by way of auxiliary members 24, for example.

The cut-out horizontal edge support member 22 supports a horizontal edge portion of the cut-out portion 16 formed in the fuselage panel 10 by means of the gripping units 3. The cut-out horizontal edge support member 22 is positioned above the horizontal members 6 and the lower edge support members 8 of the frame member 4. The cut-out horizontal edge support member 22 is arranged so as to extend along the axial direction of the fuselage panel 10 to be set on the holding fixture 2, for example, to extend in the direction parallel or oblique to the axial direction of the fuselage panel 10.

The plurality of gripping units 3 are arranged on the cut-out horizontal edge support member 22 at intervals. The cut-out horizontal edge support member 22 is positioned below the fuselage panel 10 to be held so as to allow the gripping units 3 to support the horizontal edge portion of the cut-out portion 16 formed in the fuselage panel 10 from below.

One end portion of the cut-out horizontal edge support member 22 in the longitudinal direction is joined to the arch member 7, and the other end portion of the cut-out horizontal edge support member 22 in the longitudinal direction is joined to the auxiliary member 24, for example.

The cut-out side edge support member 23 supports a side edge of the fuselage panel 10 from below. The cut-out side edge support member 23 is a member having a curved shape. The cut-out side edge support member 23 is arranged in a plane in the direction perpendicular to the axial direction of the fuselage panel 10 to be set on the holding fixture 2. The cut-out side edge support member 23 is arranged corresponding to an edge portion of the cut-out portion 16 on the side having a curvature, and the cut-out portion 16 is formed in the fuselage panel 10 to be set on the holding fixture 2.

One end of the cut-out side edge support member 23 is joined to the cut-out horizontal edge support member 22, and the other end of the cut-out side edge support member 23 is joined to the lower edge support member 8. The curved shape of the cut-out side edge support member 23, for example, the curvature of the cut-out side edge support member 23 is set according to the curvature of the fuselage panel 10 to be manufactured. In the same manner as the side edge support member 9, the plurality of gripping units 3 are mounted on the cut-out side edge support member 23 at intervals along the longitudinal direction of the cut-out side edge support member 23. The plurality of gripping units 3 grip the edge portions of the cut-out portion 16 formed in the fuselage panel 10 so that the fuselage panel 10 gripped by the gripping units 3 is held so as to have the curvature of the fuselage panel 10 to be manufactured.

As described above, the holding fixture 2 according to this embodiment supports the fuselage panel 10 at the edge portions of the cut-out portion 16 formed in the fuselage panel 10. That is, the fuselage panel 10 having the skin 11 is gripped by the plurality of gripping units 3 at the edge portions of the cut-out portion 16 formed in the fuselage panel 10. At this point of operation, the plurality of gripping units 3 are integrally supported by way of the cut-out horizontal edge support member 22 and the cut-out side edge support member 23 which are provided corresponding to the cut-out portion 16 formed in the fuselage panel 10. With such a configuration, it is possible to suppress deformation, such as deflection, generated in the skin 11 at locations around the cut-out portion 16.

In the above-mentioned first and second embodiments, the description has been made with respect to the cases where the side edge of the fuselage panel 10 is gripped by the gripping units 3 mounted on the side edge support member 9 or the cut-out side edge support member 23. However, the present invention is not limited to such embodiments. For example, a plurality of rods are mounted on the side edge support member 9 or the cut-out side edge support member 23 at intervals conforming to the curved shape of the side edge support member 9 or the cut-out side edge support member 23. The rods are configured such that the rods project in the radial direction (the direction perpendicular to the axial direction) of the fuselage panel 10, and the projection length of the rods is adjustable. The projection length of the plurality of rods is adjusted so as to obtain the shape of the fuselage panel 10 which is required to be held. The fuselage panel 10 is placed on upper surfaces of the plurality of rods (projecting end portions of the rods) so that the fuselage panel 10 is held so as to have the curvature of the fuselage panel 10 to be manufactured.

For example, assume a case where the fuselage panel 10 to be manufactured has a single curved surface with a constant curvature along the axial direction. In such a case, the curvature obtained by connecting the upper surfaces of the rods on the side edge support member 9 on one edge side is equal to the curvature obtained by connecting the upper surfaces of the rods on the side edge support member 9 on the other edge side. On the other hand, assume a case where the fuselage panel 10 to be manufactured has a double curved surface with a varying curvature along the one axis direction. In such a case, the curvature obtained by connecting the upper surfaces of the rods on the side edge support member 9 on one edge side is larger than the curvature obtained by connecting the upper surfaces of the rods on the side edge support member 9 on the other edge side.

In the above-mentioned first and second embodiments, the case is exemplified where the two arch members 7 have the same radius. However, the present invention is not limited to such embodiments. As shown in FIG. 10, the two arch members 7 may have different radii. Assume a case where the fuselage panel 10 to be manufactured has a double curved surface with a varying curvature along the axial direction. In such a case, when the fuselage panel 10 is set on the holding fixture 1 such that the axis of the fuselage panel 10 extends parallel to a horizontal plane, a portion of the fuselage panel 10 on the side having a smaller radius in transverse cross section is positioned lower than a portion of the fuselage panel 10 on the side having a larger radius in transverse cross section. As a result, when there is a significant difference between the height of the fuselage panel 10 on the side having a smaller radius and the height of the arch member 7, a component 36a of the automatic riveting machine 36 which projects in the axial direction interferes with a side surface of the arch member 7 on the fuselage panel 10 side. In this case, as shown in FIG. 10, the height of the arch member 7 positioned on the side having the smaller radius in transverse cross section of the fuselage panel 10 is lowered. With such a configuration, the automatic riveting machine 36 can be installed such that the component 36a of the automatic riveting machine 36 which projects in the axial direction is positioned above the arch member 7. Accordingly, the interference between the arch member 7 and the automatic riveting machine 36 can be prevented.

REFERENCE SIGNS LIST

1, 2 holding fixture
3 gripping unit
4 frame member
5 support body
6 horizontal member
7 arch member
8 lower edge support member (first support member)
9 side edge support member (second support member)
10 fuselage panel
11 skin
12 stringer
16 cut-out portion
21, 24 auxiliary member
22 cut-out horizontal edge support member
23 cut-out side edge support member
31 divided-panel mounting robot
32 gate-shaped automatic riveting machine
33 automatic riveting machine
34 gate-shaped frame
35 mounting robot
60 fixing base

The invention claimed is:

1. A holding fixture comprising:
a plurality of gripping units configured to grip edge portions on two opposite sides of an aircraft panel including a plate member; and
a support body configured to integrally support the plurality of gripping units, the support body being provided corresponding to the aircraft panel to be gripped by the plurality of gripping units, wherein
the aircraft panel is held such that only the edge portions of the aircraft panel are gripped by the plurality of gripping units and such that a curved shape in cross section of the aircraft panel, the cross section being taken in a direction perpendicular to one axis direction, is held only by gripping the edge portions of the aircraft panel, and
the holding fixture is configured to be conveyable in a state of holding the aircraft panel.

2. The holding fixture according to claim 1, wherein the support body includes first support members each one of which is provided corresponding to each of two opposite sides of the aircraft panel along the one axis direction, and
the plurality of gripping units supported by the first support members grips the aircraft panel at the edge portions on the two opposite sides of the aircraft panel which extend along the one axis direction.

3. The holding fixture according to claim 2, wherein a position at which each one of the first support members is fixed is variable in a circumferential direction about the one axis of the aircraft panel conforming to a shape of the aircraft panel.

4. The holding fixture according to claim 1, wherein the support body includes second support members each one of which is provided in a plane in a direction perpendicular to the one axis direction, and which is provided conforming to a curved shape of each of two opposite sides of the aircraft panel, and
the aircraft panel is placed on the second support members at edge portions on the two opposite sides of the aircraft panel which extend along a circumferential direction about the one axis.

5. The holding fixture according to claim 4, wherein a position at which each one of the second support members is fixed is variable along the one axis direction conforming to a shape of the aircraft panel.

6. The holding fixture according to claim 1, wherein the support body includes second support members each one of which is provided in a plane in the direction perpendicular to the one axis direction, and which is provided conforming to a curved shape of each of the two opposite sides of the aircraft panel, and the plurality of gripping units supported by the second support members grips the aircraft panel on the two opposite sides of the aircraft panel which extend along a circumferential direction about the one axis.

7. The holding fixture according to claim 1, wherein the holding fixture is a holding fixture for the aircraft panel, the plate member of the aircraft panel has a cut-out portion, and the holding fixture further includes:

a plurality of second gripping units configured to grip an edge portion of the cut-out portion; and a second support body which is provided corresponding to the edge portion of the cut-out portion and which supports the plurality of second gripping units such that the edge portion of the cut-out portion be gripped by the plurality of second gripping units.

8. The holding fixture according to claim 1, wherein the gripping unit is formed of a toggle clamp which uses a toggle mechanism, and the gripping unit includes a rod-shaped pressing portion configured to press the aircraft panel, and a drive unit configured to move the pressing portion.

9. A holding fixture comprising:

a plurality of gripping units configured to grip edge portions on two opposite sides of an aircraft panel including a plate member; and a support body configured to integrally support the plurality of gripping units, the support body being provided corresponding to the aircraft panel to be gripped by the plurality of gripping units, wherein the plurality of gripping units holds the aircraft panel such that the gripping units grip only the edge portions of the aircraft panel, and the aircraft panel is held such that a curved shape in cross section of the aircraft panel, the cross section being taken in a direction perpendicular to one axis direction, is held only by gripping the edge portions of the aircraft panel, the holding fixture is configured to be conveyable in a state of holding the aircraft panel, the support body includes first support members each one of which is provided corresponding to each of two opposite sides of the aircraft panel along the one axis direction, and the plurality of gripping units supported by the first support members grips the aircraft panel at the edge portions on the two opposite sides of the aircraft panel which extend along the one axis direction.

10. A holding fixture comprising:

a plurality of gripping units configured to grip edge portions on two opposite sides of an aircraft panel including a plate member; and a support body configured to integrally support the plurality of gripping units, the support body being provided corresponding to the aircraft panel to be gripped by the plurality of gripping units, wherein the plurality of gripping units holds the aircraft panel such that the gripping units grip only the edge portions of the aircraft panel, and the aircraft panel is held such that a curved shape in cross section of the aircraft panel, the cross section being taken in a direction perpendicular to one axis direction, is held only by gripping the edge portions of the aircraft panel, the holding fixture is configured to be conveyable in a state of holding the aircraft panel, the support body includes second support members each one of which is provided in a plane in the direction perpendicular to the one axis direction, and which is provided conforming to a curved shape of each of the two opposite sides of the aircraft panel, and the plurality of gripping units supported by the second support members grips the aircraft panel on the two opposite sides of the aircraft panel which extend along a circumferential direction about the one axis.

\* \* \* \* \*